(12) United States Patent
Minter

(10) Patent No.: US 6,818,128 B2
(45) Date of Patent: *Nov. 16, 2004

(54) APPARATUS FOR DIRECTING ULTRASONIC ENERGY

(75) Inventor: Bruce E. Minter, Eagle, ID (US)

(73) Assignee: The Halliday Foundation, Inc., Boise, ID (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/177,578

(22) Filed: Jun. 20, 2002

(65) Prior Publication Data

US 2003/0234274 A1 Dec. 25, 2003

(51) Int. Cl.$^7$ ................................................ C02F 1/36
(52) U.S. Cl. ........................................ 210/205; 181/142
(58) Field of Search ............................ 210/748, 198.1, 210/199, 205; 96/389; 422/20, 255; 261/DIG. 48; 181/142

(56) References Cited

U.S. PATENT DOCUMENTS

| | | | |
|---|---|---|---|
| 4,076,617 A | | 2/1978 | Bybel et al. |
| 4,280,823 A | * | 7/1981 | Szonntagh ................... 210/748 |
| 4,428,757 A | * | 1/1984 | Hall ............................ 96/175 |
| 4,850,220 A | * | 7/1989 | Asano et al. ................. 73/196 |
| 5,085,783 A | * | 2/1992 | Feke et al. ................... 210/748 |
| 5,164,094 A | * | 11/1992 | Stuckart ....................... 210/708 |
| 5,225,089 A | * | 7/1993 | Benes et al. ................. 210/748 |
| 5,466,367 A | | 11/1995 | Coate et al. .................. 210/252 |
| 5,679,257 A | | 10/1997 | Coate et al. .................. 210/695 |
| 5,728,305 A | | 3/1998 | Hawkinson ................... 210/760 |
| 6,055,859 A | * | 5/2000 | Kozuka et al. ................ 73/570 |
| 6,216,538 B1 | * | 4/2001 | Yasuda et al. ............... 73/570.5 |
| 6,299,761 B1 | | 10/2001 | Wang ........................... 210/87 |
| 6,361,698 B1 | | 3/2002 | Tai ............................... 210/760 |
| 6,444,176 B1 | * | 9/2002 | Yoshinaga et al. ............ 422/128 |

FOREIGN PATENT DOCUMENTS

JP 2002-172389 A * 6/2002

OTHER PUBLICATIONS

The Chemistry of Ultrasound by Kenneth S. Suslifk, from Yearbook of Science & the Future 1994; Encyclopaedia Britannica: Chicago, 1994, pp 138–155.
Nitric Oxide Formation by Ultrasound in Aqueous Solutions by Vladimir Misik & Peter Riesz; Published by the American Chemical Society, 1996, J. Phys. Chem 100. pp. 17986–17994.
The Removal of Bacterial Biofilm Water–Filled Tubes Using Axially Propagated Ultrasound by Mott, Stickley Coakley and Bott; Journal of Applied Microbiology 1998, B4, pp 509–514.

* cited by examiner

Primary Examiner—Frank M. Lawrence
(74) Attorney, Agent, or Firm—Joseph W. Holland (57) ABSTRACT

An apparatus and method for transmitting ultrasonic energy. The apparatus may include a vessel, such as a conduit, having a first end, a second end, and a vessel axis between the first and second ends. An ultrasonic energy emitter is positioned toward the first end of the vessel to direct ultrasonic energy into a fluid mixture contained within the vessel. An ultrasonic energy focuser is positioned toward the first end of the vessel proximate to the ultrasonic energy emitter to focus the ultrasonic energy toward the vessel axis as the ultrasonic energy approaches the second end of the vessel. A reflector is positioned toward the second end of the vessel and reflects the ultrasonic energy back toward the ultrasonic energy emitter. A signal reverser redirects at least part of the ultrasonic energy propagating away from the ultrasonic energy emitter.

49 Claims, 5 Drawing Sheets

APPARATUS FOR DIRECTING ULTRASONIC ENERGY

RELATED APPLICATIONS

This application is related to the following application assigned to a common assignee (a) "Ozone Generator", application Ser. No. 10/123,759 filed Apr. 15, 2002; (b) Method and Apparatus for Treating Fluid Mixtures with Ultrasonic Energy, application Ser. No. 10/176,728, filed Jun. 20, 2002; (c); Method and Apparatus for Treating Fluid Mixtures with Ultrasonic Energy, application Ser. No. 10/176,334, filed Jun. 19, 2002; (d) and Method and Apparatus for Directing Ultrasonic Energy, application Ser. No. 10/176,333, filed Jun. 19, 2002, which are all herein incorporated by reference.

BACKGROUND

1. Field of Invention

The present invention relates to methods and apparatuses for directing ultrasonic energy and more particularly to methods and apparatuses for directing ultrasonic energy for treating a fluid mixture contained in a vessel.

2. Background of the Invention

There are a number of conventional treatment processes for fluid mixtures including fluids including waste water and aqueous mixtures including waste matter. Treatment processes may include filtering, such as reverse osmosis filtering that removes solid contaminants from the waste water or aqueous mixture. However, because of environmental concerns, it may be difficult to dispose of the solid contaminants removed by filters. Furthermore, the filters themselves must be periodically back-flushed, which may be a time consuming process.

In an alternate process, microorganisms are disposed in the waste matter to consume or alter harmful elements in the waste matter. However, such systems generally process the waste matter in a batch mode and accordingly may be slow and labor intensive to operate.

Another conventional approach is to sterilize waste matter streams with ultraviolet light. One problem with this approach is that the waste matter must be positioned very close to the light source, which may make ultraviolet systems slow, expensive and inefficient.

Still another method includes exposing the waste matter stream to ozone which may alter harmful elements in the waste matter stream. One problem with this approach is that the cost of generating effective quantities of ozone historically has been relatively high that the process may not be economically feasible.

Another approach has been to dispose a fluid mixture containing a waste matter in a vessel and apply ultrasonic energy to the waste matter in a batch process. Exposing a fluid mixture comprising a fluid mixture to ultrasonic energy may cause chemical and/or physical changes to occur in the fluid mixture. For instance, cavitation of a liquid portion of the fluid mixture and generation of heat. Cavitation bubbles formed in the waste matter stream may grow in a cyclic fashion and ultimately collapse. This process creates very high temperatures, pressures, and thermal cycling rates. For example, it is estimated that this process may develop temperatures in the waste matter stream of up to 5,000 degrees Celsius, pressures of up to 1,000 atmospheres, and heating and cooling rates above 10 billion degrees Celsius per second for durations of less than one microsecond.

Apply ultrasonic energy to the waste matter in a batch process suffers from several drawbacks. Batch processing may be relatively slow and the efficiency with which ultrasonic energy is transmitted to waste matter contained in batch may be so low as to leave an unacceptable level of contaminants in the waste matter stream.

SUMMARY

The present invention is directed toward methods and apparatuses for directing ultrasonic energy for treating a fluid mixture contained in a vessel with the directed ultrasonic energy.

In one embodiment of the invention, an apparatus for directing ultrasonic energy includes an ultrasonic energy emitter engaged with a support member. The emitter includes a first surface and a second surface facing opposite the first surface. A signal reverser is positioned adjacent to the second surface of the ultrasonic energy emitter. The signal reverser is biased against but not adhered to the ultrasonic energy emitter. The signal reverser is positioned to receive a portion of ultrasonic energy emitted from the emitter and direct at least part of the portion of ultrasonic energy back towards the emitter.

In one embodiment of the invention, an apparatus for a vessel having a first end, a second end opposite the first end, a vessel axis extending between the first and second ends, and a generally straight portion between the first and second ends. The vessel is configured to contain a fluid mixture. The vessel also includes an ultrasonic energy emitter positioned toward the first end of the vessel to direct ultrasonic energy into the fluid mixture during operation.

The apparatus may also include an ultrasonic energy focuser positioned toward the first end of the vessel at least proximate to the ultrasonic energy emitter. The focuser may have a focusing surface configured to focus the ultrasonic energy toward the vessel axis as the ultrasonic energy moves toward the second end of the vessel. The focusing surface may include a first portion having a first parabolic shape with a first curvature, and a second portion having a second parabolic shape with a second curvature different than the first curvature.

In another aspect of the invention, the apparatus may include an ultrasonic reflector positioned toward the second end of the vessel. The reflector may have a shaped, reflective surface positioned to reflect the ultrasonic energy toward the first end of the vessel. The reflective surface may be curved with an edge at least approximately tangent to a sidewall of the vessel and a tip on, and at least approximately tangent to, an axis spaced apart from the vessel sidewall and extending between the first and second ends of the vessel.

In still a further aspect of the invention, the ultrasonic energy emitter may include a first surface facing toward an interior of the vessel and a second surface facing opposite the first surface. The apparatus may further include a signal reverser positioned adjacent to the second surface of the ultrasonic energy emitter. The signal reverser may be biased against, but not adhered to, the ultrasonic energy emitter. The signal reverser is positioned to receive a portion of ultrasonic energy emitted from the emitter and reflect at least part of the portion of ultrasonic energy into the fluid mixture during operation.

In yet a further aspect of the invention, the signal reverser may have a third surface adjacent to the second surface of the emitter, a fourth surface opposite the third surface, and a dimension between the third and fourth surfaces of approximately one quarter the wavelength of ultrasonic energy passing into the signal reverser.

The invention is also directed toward a method for focusing ultrasonic energy in a fluid mixture. The method includes transmitting ultrasonic energy from an ultrasonic energy emitter into the fluid mixture, impinging the ultrasonic energy on a shaped focusing surface to converge the ultrasonic energy toward a focal point spaced apart from the ultrasonic energy emitter, and exposing a selected constituent of the fluid mixture to the ultrasonic energy as it converges toward the focal point. In another aspect of the invention, the method may be directed toward a method for reflecting ultrasonic energy in a volume of fluid mixture. Accordingly, the method may include transmitting the ultrasonic energy from the ultrasonic energy emitter through the volume of fluid mixture, and impinging the ultrasonic energy on a shaped reflecting surface spaced apart from the ultrasonic emitter to reflect ultrasonic energy back toward the ultrasonic energy emitter. The method may further include exposing a selected constituent of the fluid mixture to the ultrasonic energy as it passes from the ultrasonic energy emitter to the reflecting surface and from the reflecting surface back toward the ultrasonic energy emitter.

Exposing a fluid mixture comprising a fluid mixture to ultrasonic energy may cause chemical and/or physical changes to occur in the fluid mixture. Temperatures and pressures developed by the collapsing cavitation bubbles may have several advantageous effects on the constituents of the waste matter stream. For example, the collapsing bubbles may form radicals, such as OH radicals which are unstable and may chemically interact with adjacent constituents in the waste matter stream to change the chemical composition of the adjacent constituents. In one such process, an OH radical reacts with nitrates in the waste matter stream to produce gases such as nitrogen dioxide. The following are sample steps in such a reaction:

$$NO_3^- + \cdot OH\_\_ \cdot NO_3 + OH^- \quad [1]$$

$$\cdot NO_3^- + \cdot OH\_H_2O\cdot + \cdot NO_2 \quad [2]$$

$$\cdot NO_2 + \cdot NO_2\_\_ \cdot NO + \cdot NO_3 \quad [3]$$

$$\cdot NO_2 + \cdot NO_2\_\_ \cdot NO + \cdot NO + O_2 \quad [4]$$

$$\cdot NO_2 + \cdot H\_\_ \cdot NO + \cdot OH \quad [5]$$

$$\cdot NO_2 + \cdot OH\_\_ \cdot NO + O_2 \quad [6]$$

$$\cdot NO_2 + \cdot O\_\_\_\cdot NO_2 + O_2 \quad [7]$$

In another embodiment, the reaction may continue, for example, in the presence of additional constituents to produce nitrites. In yet another embodiment, the cavitating bubble may alter trichloroethylene, for example, in accordance with the following simplified reaction:

$$(Cl)_2C=CHCl + 2H_2O\_\ldots\_Cl_2 + HCl + 2H_2 + 2CO \quad [1]$$

In other embodiments, the collapsing cavitation bubbles may have effects on other molecules that change a chemical composition of the molecules and/or change a phase of the molecules from a liquid or solid phase to a gaseous phase.

In still further embodiments, the collapsing cavitation bubbles may have effects on other constituents of the waste matter stream. For example, the combination of increased pressure and cavitation bubbles may disrupt a molecular structure of an organism and accordingly kill pathogenic organisms, such as bacteria. Temperatures and pressures observed in the presence of collapsing cavitation bubbles may serve to alter the structure of living cells and combust or oxidize constituents of the waste matter stream. For example, the high temperature produced by the collapsing cavitation bubble may oxidize constituents of the waste matter stream, producing by-products such as carbon dioxide and ash. The carbon dioxide may evolve from the waste matter stream and the ash may be filtered from the waste matter stream, as will be described in greater detail below. In still another embodiment, the collapsing cavitation bubbles may also separate constituents of the waste matter stream. For example, when the waste matter stream includes a mixture of oil, water, and an emulsifier, the collapsing cavitation bubbles may alter the molecular characteristics of the emulsifier and cause the emulsifier to lose its effectiveness.

Accordingly, oil and water may separate from each other and one or the other may be removed from the stream. Collapsing cavitation bubbles may have other effects on the waste matter stream that alter the characteristics of the constituents of the stream in a manner that makes the constituents more benign and/or allows the constituents to be more easily removed from the waste matter stream. In an alternate aspect of the invention, a chemical composition including a selected constituent may be oxidized to produce an ash and a gas. The fluid mixture may be contained under pressure while it is exposed to ultrasonic energy. The treatment vessel may be pneumatically coupled to a vacuum source after being exposed to the ultrasonic energy to remove gas from the fluid mixture. In still a further aspect of the invention, the fluid mixture may be exposed to a first ultrasonic energy having a first energy and a first frequency and the fluid mixture may be exposed to a second ultrasonic energy having a second energy and a second frequency.

DETAILED DESCRIPTION

The present disclosure describes apparatuses and methods for treating waste matter, such as aqueous waste matter streams. Many specific details of certain embodiments of the invention are set forth in the following description and in FIGS. 2-8 to provide a thorough understanding of these embodiments. One skilled in the art, however, will understand that the present invention may have several additional embodiments, or that the invention may be practiced without several of the details described below.

Figure 1A:
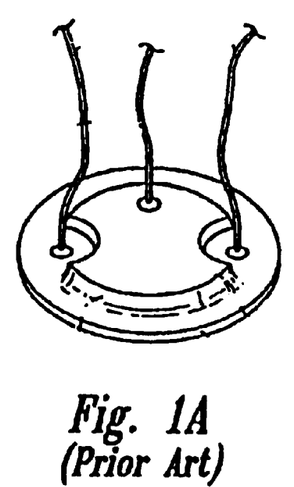
FIGS. 1A and 1B illustrate ultrasonic energy emitters and signal reversers respectively in accordance with the prior art.
Figure 1B:
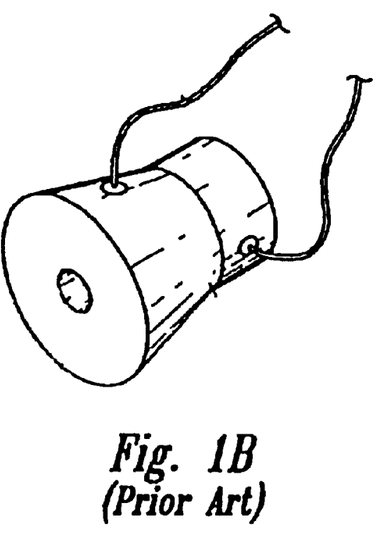
Figure 2:
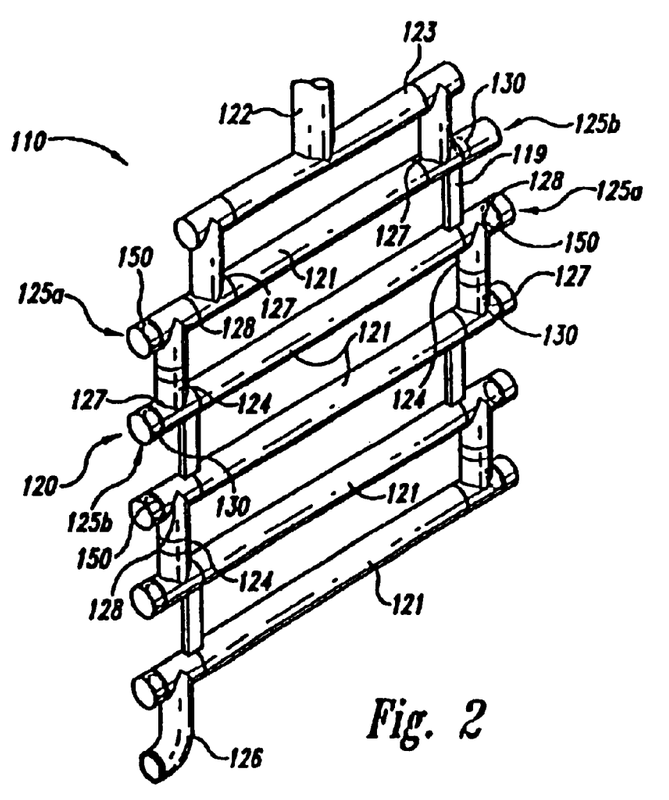
FIG. 2 is a partially schematic, isometric view of a processing vessel having ultrasonic energy focusers and ultrasonic energy reflectors in accordance with an embodiment of the invention.

FIG. 2 is a partially schematic, isometric view of processing vessel assembly 110 having ultrasonic energy sources 150 and ultrasonic energy reflectors 130 in accordance with an embodiment of the invention. In one aspect of this embodiment, processing vessel assembly 110 includes a fluid-tight processing vessel 120 formed from a plurality of fluidly connected conduits 121. A waste matter stream is introduced into processing vessel 120 and exposed to ultrasonic energy emitted by ultrasonic energy sources 150 and reflected by reflectors 130 to reduce or eliminate potentially harmful characteristics of constituents.

In one embodiment, processing vessel 120 includes vessel inlet 122 that receives a waste matter stream from a waste matter source, and an vessel outlet 126 that may be coupled to downstream devices. Vessel inlet 122 may be coupled to a manifold 123 that directs the waste matter stream into a plurality of elongated, serially and fluidly connected conduits 121. Each conduit 121 includes a first end 125a, a second end 125b, an inlet 127 and an outlet 128. The length of each conduit 121 may be proportional to the power of ultrasonic energy source 150 positioned in conduit 121, and may be approximately 6 feet in one embodiment. Outlet 128 of each conduit 121 is connected to inlet 127 of the next conduit 121 with a riser 124. Adjacent conduits 121 are supported relative to each other with struts 119. The waste matter stream proceeds generally from inlet 127 of each conduit 121 to outlet 128, then through riser 124 to inlet 127 of the next conduit 121. The waste matter stream passes from the last conduit 121 into vessel outlet 126.

In one embodiment, each conduit 121 includes an ultrasonic energy source 150, which houses a piezoelectric crystal or another ultrasonic energy emitter or generator and ultrasonic energy reflector 130. In one aspect of this embodiment, ultrasonic energy source 150 is positioned toward first end 125a of conduit 121, proximate to outlet 128, and ultrasonic energy reflector 130 is positioned toward second end 125b of conduit 121, proximate to inlet 127. Accordingly, the waste matter stream travels toward ultrasonic energy sources 150 as it moves through each conduit 121 from inlet 127 to outlet 128. Alternatively, ultrasonic energy sources 150 is positioned toward second end 125b of each conduit 121 with the waste matter stream traveling away from ultrasonic energy sources 150. In either embodiment, ultrasonic energy reflector 130 is positioned to reflect (a) at least a portion of the ultrasonic energy generated by ultrasonic energy source 150 and/or (b) products produced by the ultrasonic energy, such as cavitation bubbles, back toward ultrasonic energy source 150, as described in greater detail below with reference to FIG. 3.

Figure 3:
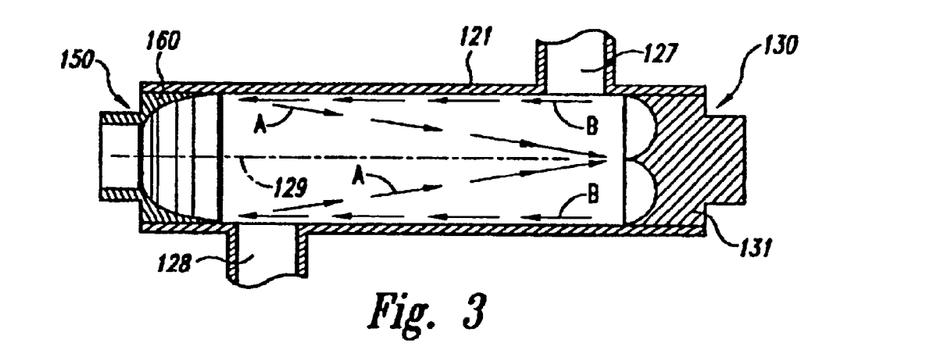
FIG. 3 is a partially schematic, cross-sectional side elevation of a portion of the processing vessel shown in FIG. 2.

FIG. 3 is a partially schematic, cross-sectional side elevation of one of conduits 121 described above with reference to FIG. 2. A fluid stream, for instance a waste matter stream enters conduit 121 through inlet 127 and proceeds through conduit 121 which includes vessel axis 129 to outlet 128, i.e., from right to left in FIG. 3. Ultrasonic energy source 150 includes focuser body 160 that focuses ultrasonic energy toward vessel axis 129, as shown schematically in FIG. 3 by arrows A. Ultrasonic energy reflector 130 includes reflector body 131 towards which the focused ultrasonic energy is directed. Ultrasonic energy reflector 130 reflects the ultrasonic energy back toward ultrasonic energy source 150, as shown schematically in FIG. 3 by arrows B. In one aspect of this embodiment, reflected energy B is reflected or disposed generally annularly and concentrically around focused energy A. In other embodiments, the relative positions of reflected and focused energies may have other arrangements. In either embodiment, focusing and reflecting the ultrasonic energy may increase the efficiency with which the ultrasonic energy treats the waste matter stream passing through conduit 121, as described in greater detail below.

Figure 4:
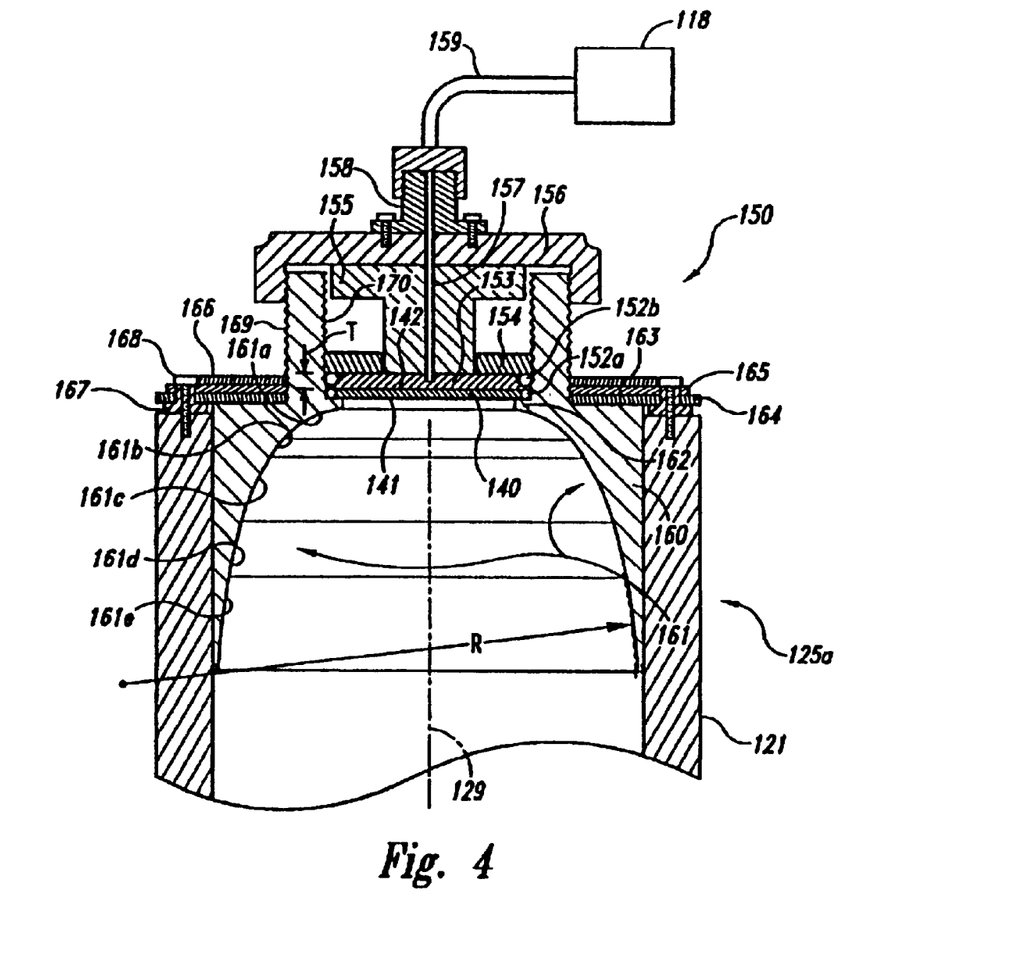
FIG. 4 is a cross-sectional side view of a portion of the processing vessel shown in FIG. 2, including an ultrasonic energy focuser in accordance with an embodiment of the invention.

FIG. 4 is a cross-sectional view of first end 125a of conduit 121 and ultrasonic energy source 150 shown in FIG. 3 in accordance with an embodiment of the invention. In one aspect of this embodiment, focuser body 160 of ultrasonic energy source 150 includes emitter support member 162, such as a flange, that supports ultrasonic emitter 140, such as a piezoelectric crystal. Focuser body 160 also includes a generally concave focusing surface 161 positioned to receive and focus ultrasonic energy emitted from ultrasonic emitter 140. Accordingly, focusing surface 161 may be curved to focus ultrasonic energy toward vessel axis 129 and ultrasonic energy reflector 130, FIG. 3. In one embodiment, focusing surface 161 may include five segments, shown in FIG. 4 as segments 161a–161e. In a further aspect of this embodiment, each segment 161a–161e may be defined by a portion of a parabola revolved about vessel axis 129. Each successive segment 161a–161e may have an average slope or inclination angle relative to vessel axis 129 that is less than the inclination angle of the preceding segment.

Accordingly, the median radius of curvature at the midpoint of successive segments, indicated by arrow "R" for segment 161e, may increase from segment 161a to segment 161e. For example, in one embodiment, segment 161a may have a midpoint radius of about 0.75 inches, segment 161b may have a midpoint radius of about 1.7 inches, segment 161c may have a midpoint radius of about 2.0 inches, segment 161d may have a midpoint radius of about 5.0 inches, and segment 161e may have a midpoint radius of about 7.0 inches. Focuser body 160 may be positioned in conduit 121 having a diameter of about 2.75 inches. In other embodiments, segments 161a–161e may have other midpoint radiuses of curvature and/or conduit 121 may have other diameters.

In one aspect of this embodiment, a junction between adjacent segments 161a–161e may be smoothed or blended to reduce the discontinuity in slope resulting from the change from one parabolic surface to another. Alternatively, the junction may be unsmoothed or unblended. In a further alternate embodiment, focusing surface 161 may include more or fewer segments than are shown in FIG. 4. In still a further alternate embodiment, focusing surface 161 may include straight segments or segments having curves defined by non-parabolic shapes, so long as focusing surface 161 tends to focus the ultrasonic energy emanating from emitter 140. Focusing surface 161 may focus energy along vessel axis 129 in one embodiment or, alternatively, along other vessel axes in other embodiments.

In one embodiment, ultrasonic emitter 140 may have a first surface 141 facing toward a fluid in conduit 121, and second surface 142 facing opposite the first surface 141. Processing vessel assembly 110 may further include an electrically conductive signal reverser 153 having an engaging surface adjacent to second surface 142 of ultrasonic emitter 140. A first O-ring 152a is positioned around ultrasonic emitter 140, and a second O-ring 152b is positioned on a peripheral flange of signal reverser 153. A contact probe 157 engages signal reverser 153 and is attached to a connector 158. Connector 158 may be coupled with a coaxial lead 159 to a signal generator 118 to provide electrical power to signal reverser 153. Signal reverser 153 may then transmit the electrical power to ultrasonic emitter 140 to activate ultrasonic emitter 140.

In a further aspect of this embodiment, ultrasonic energy source 150 may include a retainer ring 154 that threadedly engages internal threads 170 of focuser body 160. Accordingly, retainer ring 154 may be rotated to engage second O-ring 152b, which may (a) bias signal reverser 153 against ultrasonic emitter 140 while (b) sealing second O-ring 152b against focuser body 160 to protect the electrical connection between signal reverser 153 and probe 157 from exposure to the liquid in conduit 121. Ultrasonic energy source 150 may further include a plunger 155 that extends through an aperture in the center of retainer ring 154 to contact signal reverser 153. A cap 156 may threadedly engage external threads 169 of focuser body 160 to bias plunger 155 against signal reverser 153. In one aspect of this embodiment, plunger 155 may include plastic material, such as Delrin™, and in other embodiments, plunger 155 may include other materials. In either embodiment, plunger 155 may also bias signal reverser 153 against ultrasonic emitter 140.

In one aspect of an embodiment of ultrasonic energy source 150 shown in FIG. 4, ultrasonic emitter 140 and signal reverser 153 may be configured to enhance the efficiency with which ultrasonic energy is transmitted to the fluid within conduit 121, when compared with some conventional devices. For example, signal reverser 153 may have a thickness "T" that corresponds to about ¼ of the wavelength of the ultrasonic energy transmitted from second surface 142 of ultrasonic emitter 140 into signal reverser 153. In one specific embodiment in which signal reverser 153 includes copper and ultrasonic emitter 140 is configured to emit ultrasonic energy at a frequency of approximately 980 kHz, signal reverser 153 may have a thickness T of approximately 0.25 inches. When signal reverser 153 includes stainless steel, thickness T may be approximately 0.125 inches for an ultrasonic frequency of about 980 kHz. When signal reverser 153 includes brass, thickness T may be approximately 1.0 inch for an ultrasonic frequency of about 980 kHz. In other embodiments, signal reverser 153 may have other dimensions, depending on the material of signal reverser 153 and the frequency with which ultrasonic emitter 140 emits ultrasonic energy. In any of these embodiments, signal reverser 153 may have a thickness T that corresponds to approximately ¼ of the wavelength of the ultrasonic energy passing through signal reverser 153 from ultrasonic emitter 140. Accordingly, signal reverser 153 may reflect energy propagating from second surface 142 of ultrasonic emitter 140 back through ultrasonic emitter 140 and into the waste matter in conduit 121.

In another aspect of this embodiment, ultrasonic emitter 140 is not adhesively bonded to signal reverser 153, unlike some conventional arrangements. Instead, signal reverser 153 is biased against ultrasonic emitter 140 by retainer ring 154 and/or plunger 155. For example, in one particular embodiment, both retainer ring 154 and cap 156 may be tightened with a torque of from about 10 ft.-lbs. to about 20 ft.-lbs. In other embodiments, signal reverser 153 may be biased against ultrasonic emitter 140 under other torques. An advantage of these embodiments is that it may be easier to control the frequency with which ultrasonic emitter 140 propagates energy into the interior of conduit 121. It is believed that biasing signal reverser 153 against ultrasonic emitter 140, rather than gluing or otherwise adhering signal reverser 153 to ultrasonic emitter 140, may reduce or eliminate the effect of signal reverser 153 on the frequency of ultrasonic energy propagated by ultrasonic emitter 140. Accordingly, ultrasonic emitter 140 may emit ultrasonic energy at the same or nearly the same frequency as the signal transmitted to it by signal generator 118. It is believed that this effect is due to the ability of ultrasonic emitter 140 and signal reverser 153 to vibrate with at least some degree of independence relative to each other.

In still a further aspect of this embodiment, focuser body 160 may be attached directly to first end 125a of conduit 121. For example, focuser body 160 may include a radially extending washer support surface 163 that engages a washer 164. A support plate 165 is positioned against washer 164 and both support plate 165 and washer 164 may be clamped against washer support surface 163 with a lock ring 166 that engages external threads 169 of focuser body 160. Mounting bolts 168 may pass through apertures in washer 164 and support plate 165 to secure focuser body 160 to first end 125a of conduit 121. Processing vessel assembly 110 may further include isolation washers 167 between washer 164 and the end of conduit 121 to electrically isolate focuser body 160 from conduit 121. In other embodiments, ultrasonic energy source 150 may include other arrangements for attaching focuser body 160 to conduit 121.

Figure 5:
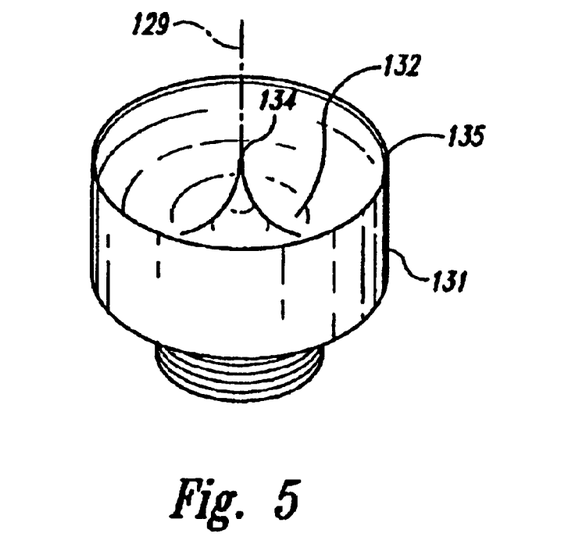
FIG. 5 is an isometric view of an ultrasonic energy reflector in accordance with an embodiment of the invention.

FIG. 5 is a side isometric view of reflector body 131 positioned opposite ultrasonic energy source 150, FIG. 3, in accordance with an embodiment of the invention. In one aspect of this embodiment, reflector body 131 may include a generally concave, curved reflective surface 132 positioned to receive the ultrasonic energy propagating from ultrasonic emitter 140, FIG. 3, and reflect at least a portion of the ultrasonic energy away from reflector body 131 and toward ultrasonic emitter 140. In one aspect of this embodiment, reflective surface 132 may be defined by a circular arc revolved about vessel axis 129. Accordingly, reflective surface 132 may have a tip or cusp portion 134 generally aligned with vessel axis 129, and a rim portion 135 disposed radially outwardly from tip portion 134. In other embodiments, reflective surface 132 may have other shapes that receive the impinging ultrasonic energy and reflect the energy back into the waste matter stream. In any of these embodiments, reflective surface 132 may be highly polished, for example, with a micro-finish or a mirror finish to increase the efficiency with which reflective surface 132 reflects ultrasonic energy.

Figure 6:
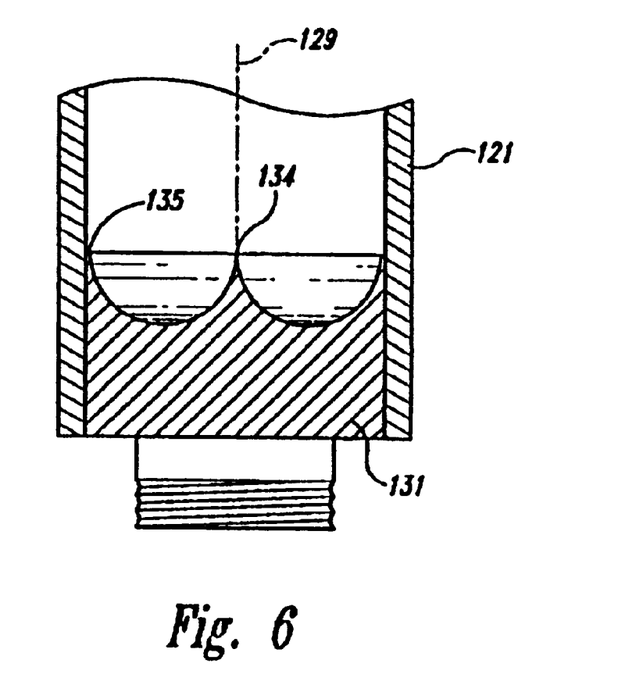
FIG. 6 is a cross-sectional, side elevation of the ultrasonic energy reflector shown in FIG. 5 in accordance with an embodiment of the invention.

FIG. 6 is a cross-sectional side view of reflector body 131 shown in FIG. 5 positioned in a conduit 121 in accordance with an embodiment of the invention. As shown in FIG. 6, rim portion 135 of reflector body 131 may be at least approximately tangent to the walls of conduit 121. Tip portion 134 may be at least approximately tangent to vessel axis 129 extending through conduit 121. In a further aspect of this embodiment, reflector body 131 may be secured to conduit 121 with an arrangement of washers, support plates and mounting bolts, not shown in FIG. 6, generally similar to that described above with reference to FIG. 4. Alternatively, reflector body 131 may be secured to conduit 121 with other arrangements in other embodiments.

Operation of an embodiment of processing vessel assembly 110 is described below with reference to FIGS. 2 and 3. Referring first to FIG. 2, a liquid waste matter stream enters processing vessel assembly 110 through vessel inlet 122, passes serially through each conduit 121, and exits processing vessel assembly 110 through vessel outlet 126. Referring now to FIG. 3, the waste matter stream enters each conduit 121 through inlet 127 and flows toward ultrasonic energy source 150 and outlet 128. Ultrasonic energy source 150 generates ultrasonic energy and introduces the energy into the waste matter stream. Focuser 160 focuses the ultrasonic energy so that it converges toward vessel axis 129 and tip portion 134 of reflector body 131. In one embodiment, focuser 160 has a shape generally similar to that shown in FIG. 4, conduit 121 has a length of approximately 6 feet and a diameter of approximately 2.75 inches, and the energy converges to a diameter of from about 0.25 inches to about 0.50 inches at tip portion 134. Reflector 130 reflects the ultrasonic energy back toward ultrasonic energy source 150 with reflected B energy disposed generally annularly around focused energy A.

During operation of processing vessel assembly 110, in accordance with an embodiment of the invention, ultrasonic energy sources 150 emit ultrasonic energy at a power and frequency that cause an aqueous, or other liquid, portion of the waste matter stream to cavitate. A frequency of the ultrasonic energy transmitted by ultrasonic energy sources 150 into the waste matter stream may be selected based on the resonant frequencies of constituents in the waste matter stream. In one particular embodiment, the frequency of ultrasonic energy source 150 may be selected to be at or above a natural resonant frequency of molecules of constituents in the stream. In one further specific example, when the flow includes farm animal fecal waste in an aqueous solution, along with pathogens such as *E. coli*, ultrasonic energy sources 150 may be selected to produce a distribution of ultrasonic waves having an energy peak at approximately 980 kilohertz. In other embodiments, the peak energy of ultrasonic energy sources 150 may be selected to occur at other frequencies, depending for example on the types, relative quantities, and/or relative potential harmful effects of constituents in the stream. Accordingly, individual ultrasonic energy sources 150 may be selected to have a particular, and potentially unique, effect on selected constituents of the waste matter stream.

In another embodiment, adjacent ultrasonic energy sources within processing vessel assembly 110 may produce different frequencies. For example, ultrasonic energy source 150 in the uppermost conduit 121 of FIG. 2 may emit energy at a higher frequency than that emitted by ultrasonic energy source 150 in the next downstream conduit 121. An advantage of this arrangement for waste matter streams having multiple constituents, each of which is best affected by ultrasonic energy at a different frequency, is that the waste matter streams may be subjected to a plurality of frequencies, with each frequency tailored to affect a particular constituent of the waste matter stream. Such an arrangement may be more effective than some conventional arrangements for removing constituents from the waste matter stream in a single apparatus.

The geometry of processing vessel assembly 110 may be selected to define the time during which any given constituent of the waste matter stream is subjected to the energy emitted by ultrasonic energy sources 150. For example, the overall length of the flow path through processing vessel assembly 110 and the rate at which the waste matter stream passes through processing vessel assembly 110 may be selected according to the amount of suspended solids in the waste matter stream, with the overall residence time within processing vessel assembly 110 being lower for waste matter streams having relatively few suspended solids and higher for waste matter streams having more suspended solids.

One feature of an embodiment of processing vessel assembly 110 described above with reference to FIGS. 2-6 is that focuser 160 and reflector 130 may operate together to reflect energy within conduit 121. For example, focuser 160 may focus energy toward reflector 130, and reflector 130 may reflect the energy to travel generally parallel to the walls of conduit 121 back toward focuser 160. An advantage of this feature is that ultrasonic energy that would otherwise be absorbed by the end walls or the side walls of conduit 121 is instead reintroduced into the flow passing through conduit 121 to increase the likelihood for altering the constituents of the flow. For example, the degree to which bubbles form in conduit 121 has been observed to be greater with the presence of focuser 160 and reflector 130 than without these components, with at least some of the bubbles tending to rise in conduit 121 when subjected to reflected ultrasonic energy.

Another feature of an embodiment of processing vessel assembly 110 described above with reference to FIGS. 2-6 is that signal reverser 153 is not adhesively bonded to ultrasonic emitter 140 and is instead biased against ultrasonic emitter 140. An advantage of this arrangement is that signal reverser 153 may be less likely to alter the frequency of signals emanating from ultrasonic emitter 140. Another advantage is that ultrasonic emitter 140 may be less likely to overheat than an emitter that is bonded to a signal reflector. Accordingly, an arrangement of ultrasonic emitter 140 and signal reverser 153 in accordance with an embodiment of the invention may have a longer life expectancy than conventional arrangements.

Yet another feature of an embodiment of processing vessel assembly 110 described above with reference to FIGS. 2-6 is that signal reverser 153 may have a dimension generally normal to an emitting surface of ultrasonic emitter 140 that corresponds to approximately ¼ of the wavelength of ultrasonic energy passing into signal reverser 153. Accordingly, signal reverser 153 may more effectively reflect into the waste matter stream a portion of the ultrasonic energy that would otherwise propagate away from the waste matter stream.

Figure 7:
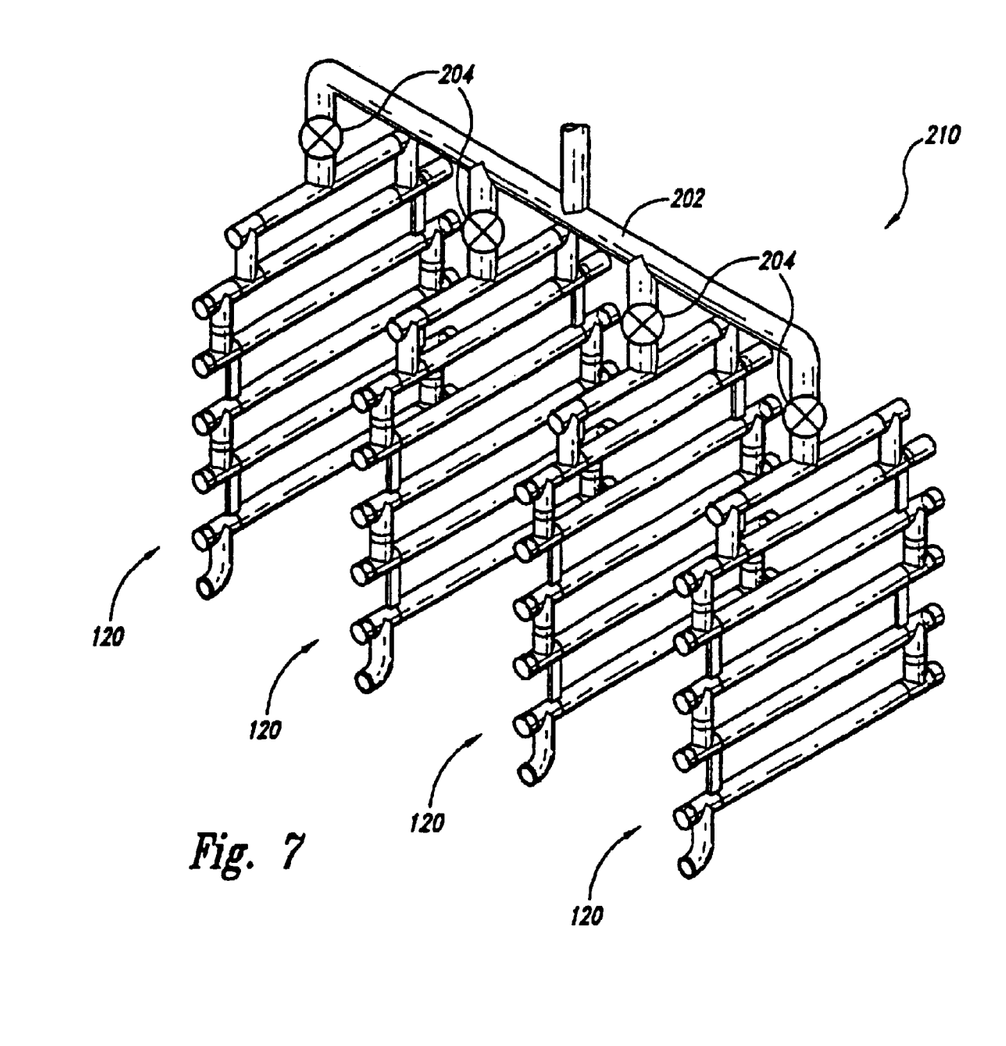
FIG. 7 is a partially schematic, isometric view of an apparatus having several processing vessels in accordance with another embodiment of the invention.

FIG. 7 is a partially schematic, isometric view of processing apparatus 210 having a plurality of processing vessels 120 in accordance with another embodiment of the invention. In one aspect of this embodiment, processing vessel 120 is coupled to a common supply manifold 202. In a further aspect of this embodiment, each processing vessel 120 includes a selector valve 204 at a junction with supply manifold 202. Accordingly, incoming waste matter may be selectively directed into one or more of processing vessels 120. In a further aspect of this embodiment, each processing vessel 120 may be configured to process a particular type of waste matter stream, for example, by including ultrasonic energy sources tuned to a particular ultrasonic frequency. Accordingly, the incoming waste matter stream may be selectively directed to a selected processing vessel 120 configured to best interact with the constituents of that waste matter stream.

Figure 8:
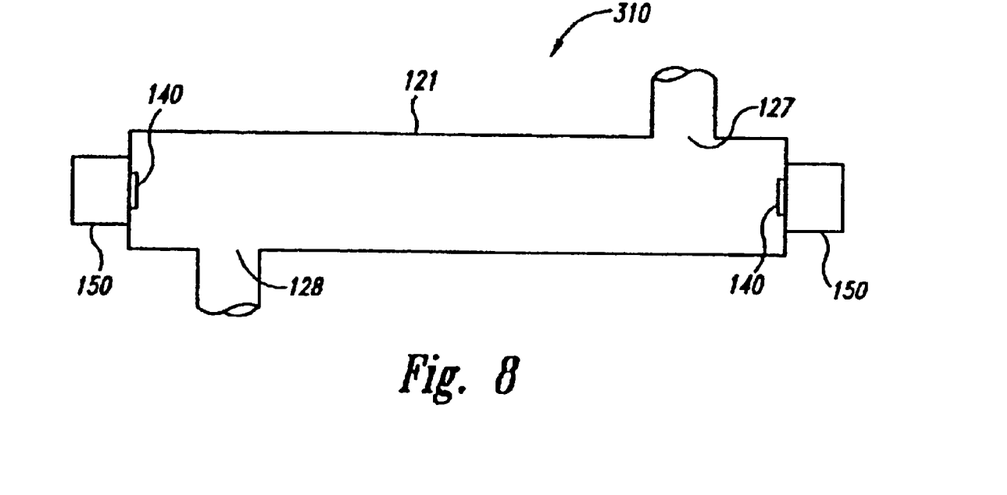
FIG. 8 is a partially schematic, cross-sectional view of a portion of a processing vessel having two ultrasonic energy emitters in accordance with another embodiment of the invention.

FIG. 8 is a partially schematic, cross-sectional side elevation of a portion of processing vessel assembly 310 that includes a conduit 121 having an inlet 127 and an outlet 128 arranged in a manner generally similar to that of processing vessel assembly 110 described above with reference to FIG. 2. In one aspect of this embodiment, processing vessel assembly 310 includes two ultrasonic energy sources 150 positioned at opposite ends of conduit 121. Each ultrasonic energy source 150 includes an ultrasonic energy emitter 140 generally similar to those described above with reference to FIGS. 2-7. Accordingly, processing vessel assembly 310 may increase the amount of ultrasonic energy introduced to the waste matter stream passing through conduit 121 compared with conventional devices having a single ultrasonic energy source. Conversely, an advantage of a device having an ultrasonic focuser and reflector generally similar to those described above with reference to FIGS. 2-6 is that the reflected ultrasonic energy may be reflected around the energy emitted from ultrasonic emitter 140 to impinge on focuser 160, rather than directly on ultrasonic emitter 140. Accordingly, ultrasonic emitter 140 may be less subject to long-term wear than ultrasonic energy sources 150 shown in FIG. 8.

Figure 9:
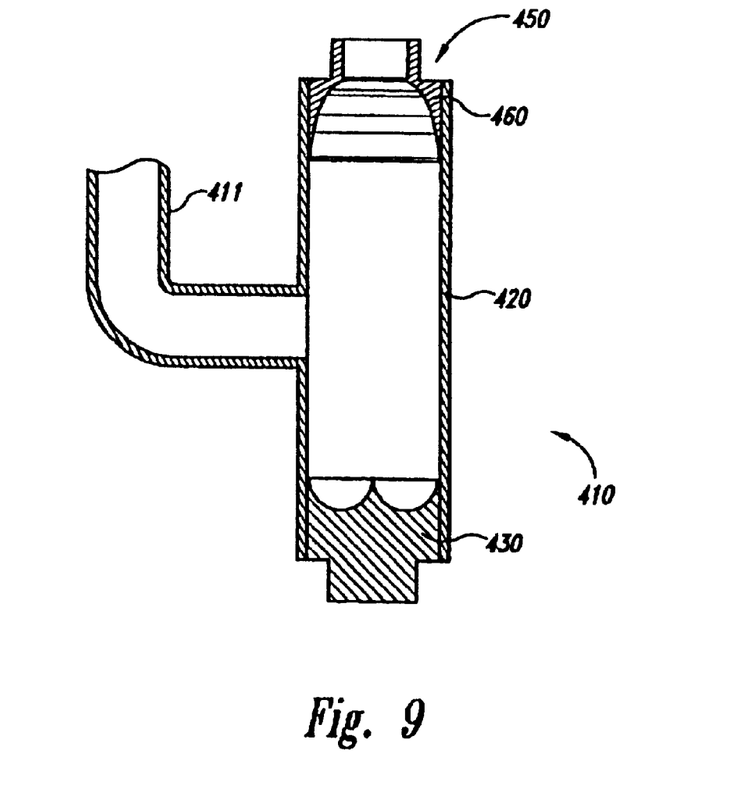
FIG. 9 is a partially schematic, cross-sectional view of a processing vessel for processing waste matter in a batch mode in accordance with another embodiment of the invention.

FIG. 9 is a partially schematic, cross-sectional view of processing vessel assembly 410 configured to process waste matter in a batch mode in accordance with another embodiment of the invention. In one aspect of this embodiment, processing vessel assembly 410 includes vessel 420 having an ultrasonic energy source 450 and focuser 460 at one end, and ultrasonic energy reflector 430 at an opposite end. A fluid may be introduced to vessel 420 through inlet/outlet 411 and subjected to ultrasonic energy in a manner generally similar to that described above with reference to FIGS. 2-6. After a selected period of time, the fluid may be removed through inlet/outlet 411.

In an alternative arrangement, processing vessel assembly 410 includes two ultrasonic energy sources 450, one at each end of vessel 420, in a manner generally similar to that described above with reference to FIG. 8.

From the foregoing, it will be appreciated that specific embodiments of the invention have been described herein for purposes of illustration, but that various modifications may be made without deviating from the spirit and scope of the invention. For example, in one alternate embodiment, the apparatus may include a support member that supports the ultrasonic energy emitter, but does not have a focusing surface. The apparatus may include a reflector and/or a signal reverser arranged in a manner generally similar to one or more of the embodiments described above with reference to FIGS. 2-9. Accordingly, the invention is not limited except as by the appended claims.

I claim:

1. An apparatus for transmitting ultrasonic energy, comprising:
    a support member;
    an ultrasonic energy emitter engaged with the support member, the ultrasonic energy emitter having a first surface and a second surface facing opposite the first surface;
    a signal reverser positioned adjacent to the second surface of the ultrasonic energy emitter, the signal reverser biased against but not adhered to the ultrasonic energy emitter, the signal reverser positioned to receive a portion of ultrasonic energy emanating from the emitter and direct at least part of the portion of ultrasonic energy back into and through the emitter; and
    a vessel having a first end, a second end opposite the first end and a vessel axis extending between the first and second ends, the vessel configured to contain a fluid mixture, the support member coupled to the vessel and engaged with the ultrasonic energy emitter to support the emitter relative to the vessel.

2. The apparatus of claim 1 wherein the vessel further comprises:
    an inlet fluidly connected to the vessel and proximate to the second end; and
    an outlet fluidly connected to the vessel and proximate to the first end.

3. The apparatus of claim 1 wherein the vessel further comprises:
    an ultrasonic energy focuser positioned toward the first end of the vessel at least proximate to the ultrasonic energy emitter, the focuser having a focusing surface configured to focus the ultrasonic energy toward the vessel axis when the ultrasonic energy approaches the second end of the vessel; and
    an ultrasonic energy reflector positioned toward the second end of the vessel and having a shaped reflective surface configured to reflect the ultrasonic energy back toward the ultrasonic energy emitter.

4. The apparatus of claim 1 further comprising a biasing member threadedly engaged with the support member and coupled to the signal reverser to bias the signal reverser into engagement with the ultrasonic energy emitter.

5. The apparatus of claim 1 wherein the ultrasonic energy emitter includes a piezoelectric crystal.

6. The apparatus of claim 1 wherein the ultrasonic energy emitter is configured to emit ultrasonic energy at a selected frequency and wherein the signal reverser has a third surface adjacent to the second surface of the ultrasonic energy emitter, the signal reverser further having a fourth surface facing opposite the third surface, and further wherein the signal reverser has a dimension between the third and fourth surfaces that is approximately one quarter of a wavelength of the ultrasonic energy in the signal reverser.

7. An apparatus for transmitting ultrasonic energy comprising:
    a signal generator configured to transmit an electrical signal at a selected ultrasonic frequency;
    an ultrasonic energy emitter operatively coupled to the signal generator to emit ultrasonic energy at least approximately at the selected frequency, the ultrasonic energy emitter having a first surface and a second surface facing opposite the first surface; and
    a signal reverser operatively coupled between the signal generator and the ultrasonic energy emitter, the signal reverser having a third surface positioned adjacent to the second surface of the ultrasonic energy emitter to direct at least some of the ultrasonic energy emitted from the second surface of the ultrasonic energy emitter back through the ultrasonic energy emitter to propagate from the first surface of the ultrasonic emitter, the signal reverser further having a fourth surface facing opposite the third surface, the signal reverser still further having a dimension between the third and fourth surfaces that corresponds to about one quarter of a wavelength of the ultrasonic energy traveling in the signal reverser.

8. The apparatus of claim 7 wherein the selected frequency is approximately 980 kHz, the signal reverser includes copper, and the dimension between the third and fourth surfaces of the signal reverser is about 0.25 inches.

9. The apparatus of claim 7 wherein the selected frequency is approximately 980 kHz, the signal reverser includes stainless steel, and the dimension between the third and fourth surfaces of the signal reverser is substantially equal to 0.125 inches.

10. The apparatus of claim 7 wherein the selected frequency is approximately 980 kHz, the signal reverser includes brass, and the dimension between the third and fourth surfaces of the signal reverser is about 1.0 inch.

11. The apparatus of claim 7 wherein the signal reverser is biased against but not adhered to the ultrasonic energy emitter.

12. An apparatus for focusing ultrasonic energy in a stream of a flowable substance, the apparatus comprising:
    a conduit having a first end, a second end opposite the first end, an inlet proximate to the second end, and an outlet proximate to the first end, the conduit further having a generally straight centerline axis extending between the first and second ends, the conduit further having a sidewall generally parallel to the centerline axis;

an ultrasonic energy emitter positioned toward the first end of the conduit and having a first surface facing toward the second end of the conduit, the ultrasonic energy emitter further having a second surface facing away from the first surface, the first surface intersected by the centerline axis, the ultrasonic energy emitter configured to emit ultrasonic energy at a power and frequency sufficient to change a phase and/or a chemical composition of a selected constituent in the fluid mixture;

an ultrasonic focuser positioned toward the first end of the conduit proximate to the ultrasonic energy emitter, the focuser having a focusing surface positioned to focus the ultrasonic energy toward the centerline axis as the ultrasonic energy approaches the second end of the conduit, the focusing surface including at least a first and second portion with the first portion defining a first parabolic shape and the second portion defining a second parabolic shape different than the first parabolic shape; and an ultrasonic reflector positioned toward the second end of the conduit, the reflector having a reflective surface positioned to reflect the ultrasonic energy toward the first end of the conduit, the reflective surface defined by a section of a circle revolved about the centerline axis, the reflective surface having an edge adjacent to the sidewall and at least approximately tangent to the sidewall, the reflective surface further having a tip positioned on the centerline axis and at least approximately tangent to the centerline axis.

13. The apparatus of claim 12 further comprising a signal reverser positioned adjacent to the second surface of the ultrasonic energy emitter, the signal reverser biased against but not adhered to the ultrasonic energy emitter, the signal reverser positioned to receive a portion of ultrasonic energy emitted from the emitter and direct at least part of the portion of ultrasonic energy into the fluid mixture during operation.

14. An apparatus for focusing ultrasonic energy, comprising:

a vessel having a first end, a second end opposite the first end, a vessel axis extending between the first and second ends, and a generally straight portion between the first and second ends, the vessel configured to removably contain a fluid mixture;

an ultrasonic energy emitter positioned toward the first end of the vessel to emit ultrasonic energy into the fluid mixture during operation; and an ultrasonic energy focuser positioned toward the first end of the vessel at least proximate to the ultrasonic energy emitter, the focuser having a focusing surface configured to focus the ultrasonic energy toward the vessel axis as the ultrasonic energy moves toward the second end of the vessel.

15. The apparatus of claim 14 wherein a first portion of the focusing surface has a first generally parabolic shape with a first curvature and a second portion of the reflective surface has a second parabolic shape with a second curvature different than the first curvature, the second portion non-tangential to the first portion at an intersection between the first and second portions.

16. The apparatus of claim 14 wherein the vessel includes a cylinder generally axis symmetric about the vessel axis, further wherein the emitter is intersected by the vessel axis and the focusing surface extends radially outwardly from the emitter and axially away from the emitter, the focusing surface having first, second, third, fourth and fifth curved portions with each curved portion defining an annular region about the vessel axis and having an average slope relative to the vessel axis, the first, second, third, fourth and fifth portions positioned successively further from the emitter and having successively smaller average slopes relative to the vessel axis.

17. The apparatus of claim 14 wherein the vessel includes a cylinder generally axis symmetric about the vessel axis, further wherein the emitter is intersected by the vessel axis and the focusing surface extends radially outwardly from the emitter and axially away from the emitter, the focusing surface having first, second, third, fourth and fifth curved portions with each curved portion defining an annular region about the vessel axis and having a median radius of curvature perpendicular to the vessel axis, the first, second, third, fourth and fifth portions having successively larger median radiuses of curvature.

18. The apparatus of claim 14 wherein the vessel includes a channel elongated along the vessel axis and axis symmetric about the vessel axis.

19. The apparatus of claim 14 wherein the ultrasonic emitter has a central portion intersected by the vessel axis and further wherein the focusing surface is disposed radially outwardly from the vessel axis.

20. The apparatus of claim 14 wherein the emitter is sized to emit ultrasonic energy at a selected power and the vessel has a vessel length between the first and second ends, the vessel length directly proportional to the selected power.

21. The apparatus of claim 14 wherein the ultrasonic emitter has a first surface facing toward an interior of the vessel and a second surface facing opposite the first surface, and wherein the apparatus further comprises a signal reverser positioned adjacent to the second surface of the ultrasonic energy emitter, the signal reverser biased against but not adhered to the ultrasonic energy emitter, the signal reverser positioned to receive a portion of ultrasonic energy emitted from the emitter and transmit at least part of the portion of ultrasonic energy into the fluid mixture during operation.

22. The apparatus of claim 14 wherein the ultrasonic energy emitter includes an electrically powered piezoelectric transducer.

23. The apparatus of claim 14 wherein the ultrasonic energy emitter is removably coupled to the focuser and the focuser is removably coupled to the vessel.

24. The apparatus of claim 14 wherein the ultrasonic energy emitter is configured to emit ultrasonic energy having a peak power at a frequency of approximately 980 kilohertz.

25. The apparatus of claim 14 wherein the ultrasonic emitter has a first surface facing toward the second end of the vessel and a second surface facing away from the first surface, the first surface intersected by the vessel axis, the ultrasonic emitter configured to emit ultrasonic energy at a power and frequency sufficient to change a phase and/or a chemical composition of a selected constituent in the fluid mixture.

26. The apparatus of claim 14 wherein the vessel includes an inlet port proximate to the second end and an outlet proximate to the first end.

27. The apparatus of claim 14 wherein the vessel has a port positioned to receive an incoming flow of the fluid mixture and pass an outgoing flow of the fluid mixture during operation.

28. An apparatus for reflecting ultrasonic energy comprising:
a vessel having a first end, a second end opposite the first end, and a generally straight portion between the first and second ends, the vessel configured to removably contain a fluid mixture;
an ultrasonic energy emitter positioned toward the first end of the vessel to transmit ultrasonic energy into the vessel; and
an ultrasonic reflector positioned toward the second end of the vessel, the reflector having a shape defined generally by an arc revolved about a vessel axis extending between the first and second ends of the vessel, reflective surface positioned to reflect the ultrasonic energy toward the first end of the vessel.

29. The apparatus of claim 28 wherein the vessel has a sidewall and an axis extending between the first and second ends of the vessel, the axis spaced apart from and generally parallel to the sidewall, and wherein the reflective surface is curved and has an edge at least approximately tangent to the sidewall, the reflective surface further having a tip at least approximately tangent to the axis.

30. The apparatus of claim 28 wherein the reflective surface has a micro finish and/or a mirror finish.

31. The apparatus of claim 28 wherein the vessel has a circular cross sectional shape.

32. The apparatus of claim 28 wherein the vessel has a vessel axis extending between the first and second ends of the vessel and wherein the vessel has a vessel sidewall generally parallel to the vessel axis, further wherein the reflector is positioned to reflect the ultrasonic energy along an axis generally parallel to the vessel axis and the sidewall.

33. The apparatus of claim 28 wherein the vessel is elongated between the first and second ends along a generally straight vessel axis and further wherein the vessel, the emitter and the reflector have shapes that are axis symmetric about the vessel axis.

34. The apparatus of claim 28 wherein at least a portion of the reflective surface has a circular cross-sectional shape when intersected by a plane passing through an axis extending from the first end of the vessel to the second end of the vessel.

35. The apparatus of claim 28 further comprising a focusing surface positioned proximate to the ultrasonic energy emitter and configured to focus toward the ultrasonic reflector ultrasonic energy emanating from the ultrasonic energy emitter.

36. The apparatus of claim 35 wherein a first portion of the focusing surface has a first parabolic shape with a first curvature and a second portion of the focusing surface has a second parabolic shape with a second curvature different than the first curvature.

37. The apparatus of claim 28 wherein the vessel includes a fluid inlet port toward the second end between the reflector and the emitter, and a fluid outlet port toward the first end between the inlet port and the emitter.

38. The apparatus of claim 28 wherein the vessel includes a first channel and wherein the apparatus further comprises:
a second channel; and
an inlet manifold coupled to the first and second channels to direct a first portion of the fluid mixture into the first channel and a second portion of the fluid mixture into the second channel.

39. The apparatus of claim 28 wherein the vessel includes a first channel, the ultrasonic emitter is a first ultrasonic emitter, and wherein the apparatus further composes:
a second channel;
an inlet manifold coupled to the first and second channels to direct a first portion of the fluid mixture into the first channel and a second portion of the fluid mixture into the second channel; and
a second ultrasonic emitter positioned in the second channel, with the first ultrasonic emitter configured to emit ultrasonic energy at a first frequency and the second ultrasonic emitter configured to emit ultrasonic energy at a second frequency different than the first frequency.

40. The apparatus of claim 28 wherein the ultrasonic energy emitter is a first ultrasonic energy emitter and the vessel includes a first conduit portion housing the first ultrasonic energy emitter, and wherein the vessel further includes a second conduit portion downstream from the first conduit portion and housing a second ultrasonic energy emitter.

41. The apparatus of claim 28 wherein the vessel has a port positioned to receive an incoming flow of the fluid mixture and pass an outgoing flow of the fluid mixture during operation.

42. The apparatus of claim 28 wherein the vessel includes an inlet positioned to receive an incoming flow of the fluid mixture and an outlet positioned to pass an outgoing flow of the fluid mixture during operation.

43. The apparatus of claim 28 wherein the ultrasonic energy emitter is configured to emit ultrasonic energy having a peak power at a frequency of approximately 980 kilohertz.

44. The apparatus of claim 28 wherein the ultrasonic emitter has a first surface facing toward the second end and a second surface facing away from the first surface, the first surface intersected by a vessel axis extending between the first and second ends of the vessel, the ultrasonic emitter configured to emit ultrasonic energy at a power and frequency sufficient to change a phase and/or a chemical composition of a selected constituent in the fluid mixture.

45. An apparatus for focusing and reflecting ultrasonic energy, comprising:
a vessel having a first end, a second end opposite the first end, a vessel axis extending between the first and second ends, and a generally straight portion between the first and second ends, the vessel configured to removably contain a fluid mixture;
an ultrasonic energy emitter positioned toward the first end of the vessel to direct ultrasonic energy into the vessel;
an ultrasonic focuser positioned toward the first end of the vessel proximate to the ultrasonic energy emitter, the focuser having a focusing surface positioned to focus the ultrasonic energy toward the vessel axis as the ultrasonic energy approaches the second end of the vessel; and
an ultrasonic reflector positioned toward the second end of the vessel, the reflector having a reflective surface positioned to receive the ultrasonic energy from the emitter and the focuser and reflect the ultrasonic energy toward the first end of the vessel.

46. The apparatus of claim 45 wherein the focuser is positioned to focus the ultrasonic energy at a focal point, and wherein at least a portion of the reflective surface is positioned at the focal point, the reflective surface having a shape defined by a section of a circle revolved about an axis extending between the first and second ends of the vessel, the reflective surface further having a tip positioned approximately at the focal point.

47. The apparatus of claim 45 wherein the focuser is positioned to direct a converging beam of ultrasonic energy toward the second end of the vessel and the reflector is positioned to direct reflected ultrasonic energy toward the first end of the vessel with at least a portion of the reflected ultrasonic energy disposed annularly about the converging beam.

48. The apparatus of claim 45 wherein the focuser is positioned to focus the ultrasonic energy at a focal point, and further wherein at least a portion of the reflective surface is positioned at the focal point.

49. The apparatus of claim 45 wherein the ultrasonic energy emitter is sized to emit ultrasonic energy at a selected power and wherein a length of the vessel between the ultrasonic emitter and the reflector is selected to be directly proportional to the selected power.

* * * * *